Oct. 1, 1963   A. R. CUNNINGHAM   3,105,338
CROP CONDITIONER

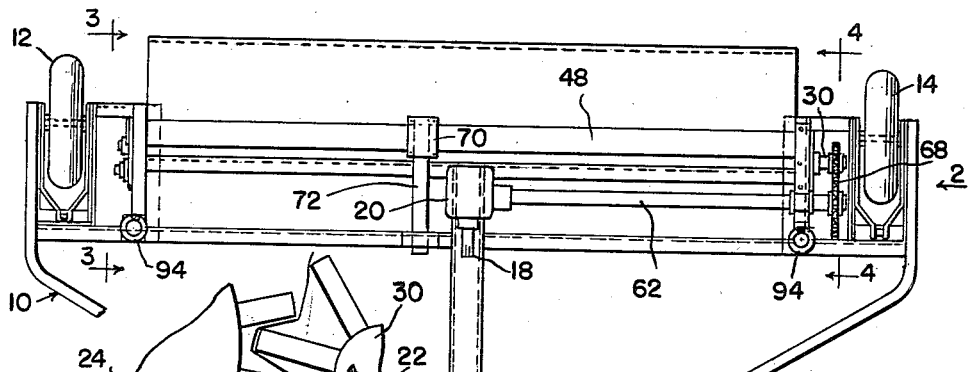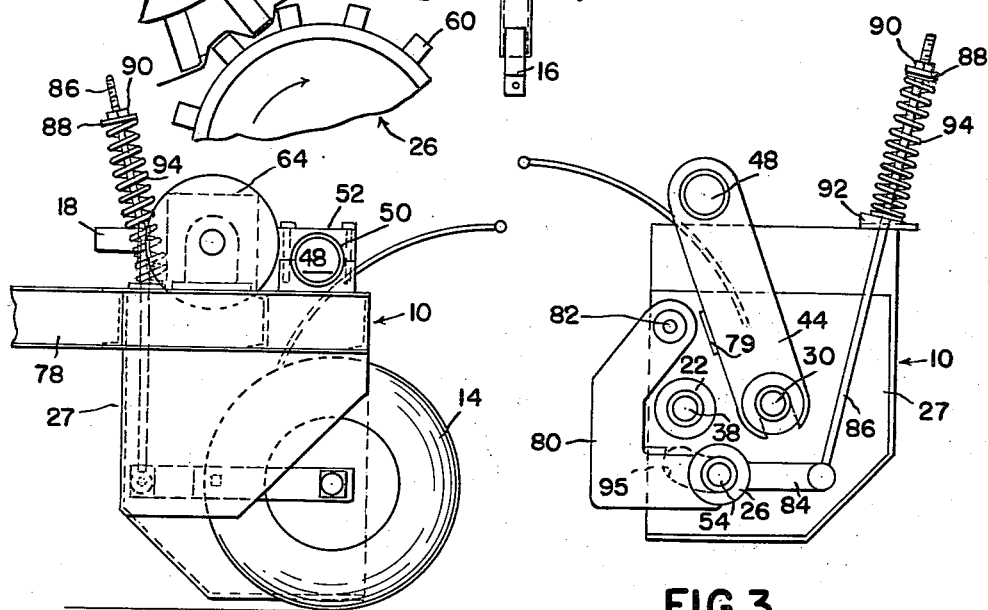

Filed Sept. 26, 1960   2 Sheets-Sheet 2

INVENTOR.
ARTHUR RAYMOND CUNNINGHAM
BY
Whittemore, Hulbert & Belknap
ATTORNEYS

3,105,338
CROP CONDITIONER
Arthur Raymond Cunningham, Chicago, Ill., assignor to Cunningham & Sons, Chicago, Ill., a partnership
Filed Sept. 26, 1960, Ser. No. 58,407
6 Claims. (Cl. 56—1)

This invention relates to a crop conditioner and refers more particularly to an improved machine cooperative to condition the crop in such a manner as to promote the curing thereof by accelerating release of moisture from the stems whereby the stems and leaves will cure in approximately the same time.

The harvesting of hay or similar crops is usually carried out by mowing the hay and leaving it in swaths on the field to dry or cure. Thereafter the hay is formed into windrows by means of a side delivery rake or similar machine. The windrowing step not only turns over the hay to expose under portions to the air and sun, but the swaths are considerably narrowed so that they may be more readily picked up by machines such as balers, hay choppers, hayloaders, etc.

It has been found over the years that the stems of hay, alfalfa, etc., contain considerably more moisture than the leaves, whereas the leaves contain by far the greater proportion of food value. The greater proportion of moisture in the stems obviously requires prolonged curing, but such prolonged curing results in over-curing of the leaves, whereupon the leaves become dry and brittle and become detached from the stems during subsequent handling of the crops, thus, materially lessening the nutrient content of the crop.

An essential object of this invention is to provide means for accelerating the release of moisture from the stems.

Another object of the invention is to provide means for accelerating the release of moisture from the stems without simultaneously squeezing or bruising the leaves or otherwise increasing the rate at which moisture is released therefrom.

Another object of the invention is to provide a crop conditioner composed of a plurality of parallel rolls mounted on a frame movable over a field on which harvested plant toppings form a layer supported on their stubble, the rolls each having circumferentially spaced flutes or blades which extend generally lengthwise thereof, the flutes of the rolls interdigitating with one another at spaced points defining bites at the spaced points of interdigitation to receive the toppings. According to this construction, one of the bites is positioned to receive toppings directly from the layer and to grip and deform the toppings and deliver them to succeeding bite for similar action on the stems of the toppings, thereby to crack and stretch the stems and allow an accelerated rate of moisture discharge. The toppings are deformed by reason of the fact that they are folded into the pockets between the flutes of one roll by the flutes of another roll interdigitating therewith, and are stretched at the same time because of the fact that they are simultaneously gripped and deformed by the other set of interdigitating flutes. The deformation of the stems together with the stretching thereof cracks or fractures the stems and opens them for the accelerated discharge of moisture, so that curing is facilitated.

Another object of the invention is to provide a crop conditioner as described above in which the spaces between the adjacent flutes on each roll provide rather large pockets for the interdigitating flutes, to accommodate the leaves of the crop so that the leaves may pass through the rolls without being squeezed or bruised or otherwise broken. It will be readily understood that if the interdigitating flutes mesh too closely, the clearance allowed will be such that the leaves of the toppings will not pass readily therebetween and thus will also be broken and deformed. This, of course, is undesirable from the standpoint of retention of food value.

Another object of the invention is to provide a crop conditioner as described above having first and second rolls provided with interdigitating flutes, and a third roll having flutes interdigitating with the flutes of the first roll at a point spaced from the point of interdigitation of the flutes of the first and second rolls. The spacing between the points of flute interdigitation will be such that a crop or topping of normal length will be simultaneously gripped and deformed at both points of flute interdigitation.

Another object of the invention is to provide a crop conditioner in which both the first and second rolls referred to above are mounted for retraction movement from the operative position of flute interdigitation to clear foreign objects, for example.

Another object of the invention is to provide a crop conditioner as described above in which resilient means oppose such retraction movement of the first and second rolls, the resilient means for the first roll offering a greater resistance to such movement than the resilient means for the second roll.

Another object of the invention is to provide a crop conditioner in which a drive is connected to one of the rolls, preferably the third roll, for positively driving the same, the remaining rolls being driven from the one roll by flute interdigitation.

Another object of the invention is to provide a crop conditioner in which the spacing between the flutes of the first roll is less than the spacing between the flutes of the third roll and greater than that between the flutes of the second roll.

Other objects, advantages and novel features of the invention will become more apparent as the following description proceeds, especially when considered with the accompanying drawings, wherein:

FIG. 1 is a top plan view of a crop conditioner constructed according to my invention.

FIG. 2 is a side elevational view of the crop conditioner shown in FIG. 1 looking in the direction of the arrow 2 in FIG. 1.

FIG. 3 is a view taken on the line 3—3 of FIG. 1.

FIG. 6 is an enlarged semi-diagrammatic view of a portion of FIG. 4.

Figure 4:
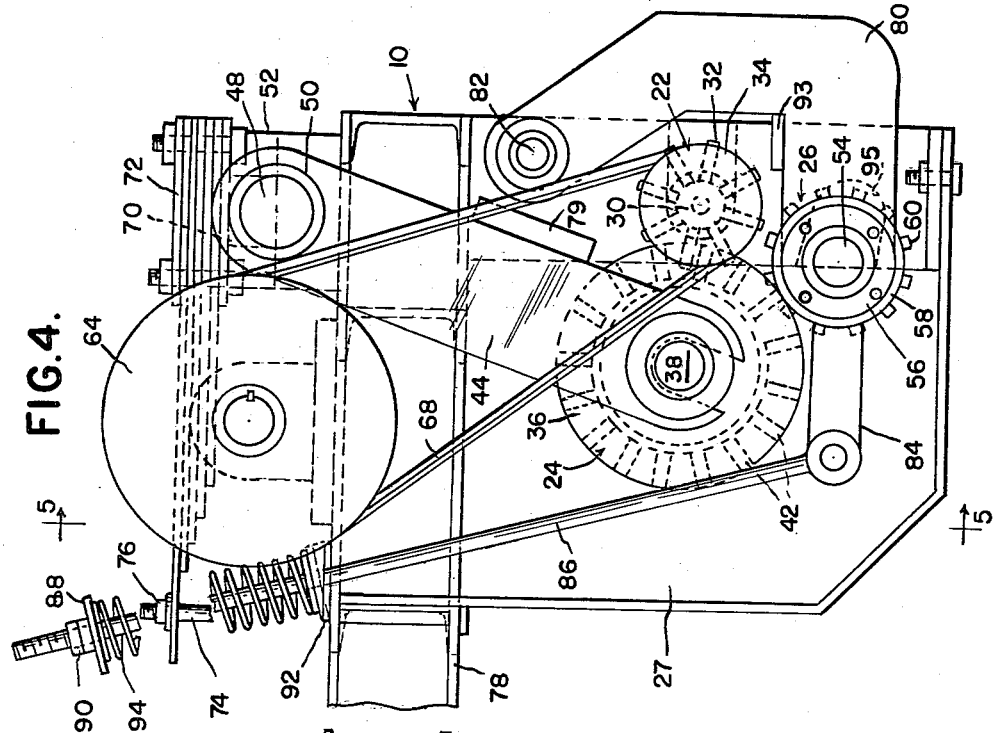
FIG. 4 is a view taken on the line 4—4 of FIG. 1.

Referring now more particularly to the drawings, the apparatus comprises a main frame 10 carried on right and left hand wheels 12 and 14 which thus fix the frame at a predetermined height above the field over which it is caused to advance, as by being connected to a tractor or the like (not shown) through the medium of a draft tongue 16. The numeral 18 represents generally a propeller shaft adapted to have a typical connection to the power take-off shaft (not shown) of the tractor, all as is well understood. The propeller shaft operates a transmission including a gear box 20, etc., to be presently described for driving the crop-conditioning rolls 22, 24 and 26.

The rolls are disposed with their axes parallel and at right angles to the direction of advance of the machine. The rear or driven roll 22 is mounted in fixed journals on upright frame members, one of which is indicated at 27 in FIG. 5. The roll 22 is composed of a central shaft 30 having radiating therefrom in uniform circumferentially spaced relation a plurality of blades or flutes 32. The blades extend from one end of the shaft to the other and are relatively narrow, the distance between the blades at the tips thereof being substantially greater than the thickness of the blades themselves. End plates 34 are provided at each end of the shaft which engage the ends of the flutes. The blades or flutes are flat and extend lengthwise of the shaft, the planes thereof passing through the axis of the shaft.

Figure 5:
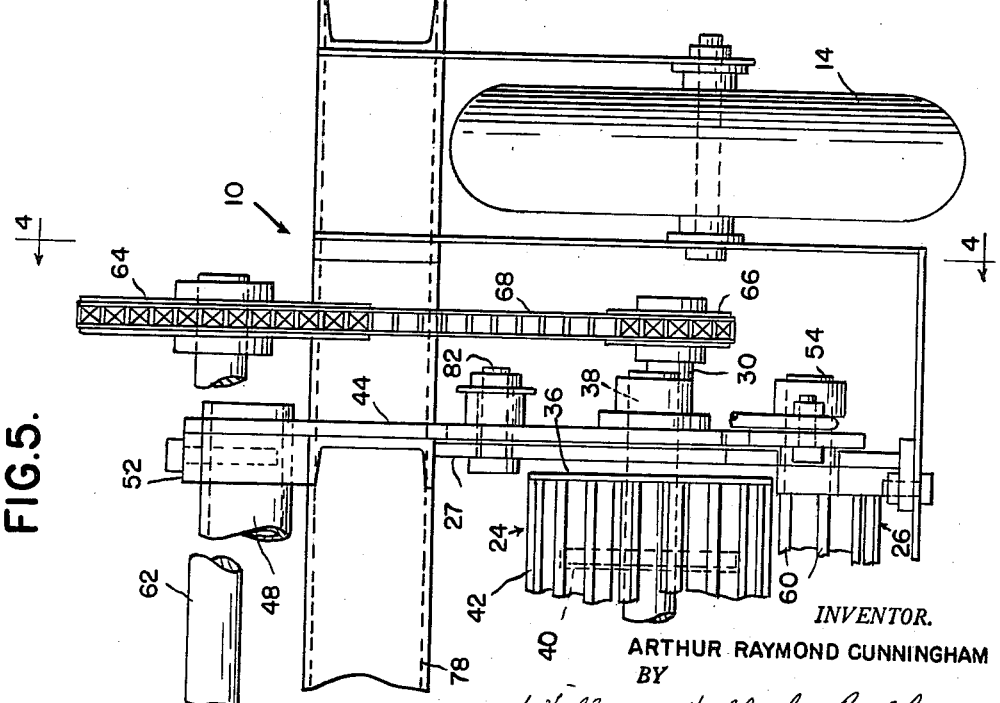
FIG. 5 is a view taken on the line 5—5 of FIG. 4.

The roll 24 is of substantially larger diameter than the driven roll 22 and is a cage type roll. End plates 36 are provided at each end of the roll 24, being secured to the shaft 38 thereof. At spaced points along the length of the shaft between the end plates, a plurality of intermediate flute supporting disks 40 are provided, one of which is shown in FIG. 5. The disks 40 are rigidly secured to the shaft and provide an inner support for the flutes at spaced points along their length. The flutes are generally designated 42 and are in the form of flat blades, the planes of which pass through the axis of the shaft. The blades thus extend from one end plate to the other and are disposed radially, being uniformly spaced. The blades 42 are relatively narrow as compared with the circumferential space between the blades at the tips thereof. The blades rest on or are secured to the peripheries of the disks 40. Thus, the roll 24 is in the form of an open cage, the space from the shaft 38 radially outward being open except for the disks 40 and the blades or flutes 42.

As pointed out above, the shafts 30 and 38 extend parallel to one another, and the shaft 38 is journaled at opposite ends in the lower ends of the support arms 44, one of which is shown in FIGS. 4 and 5. The support arms 44 are parallel to one another and the upper ends are secured to a transverse shaft 48. The shaft is journaled for free rotation in bearings 50 carried by the end support blocks 52. Hence the arms 44 can rotate as a unit with the shaft 48 to which they are rigidly connected, the shaft 48 extending parallel to shafts 30 and 38, or at right angles to the direction of advance of the machine.

The lower or pickup roll 26 has a shaft 54 which is parallel to shafts 30 and 38, and end plates 56 of the roll rigidly secured to the shaft provide a mounting for the drum 58 which extends between the end plates in concentric relation with the shaft. Hence the drum is rigidly secured to the shaft for rotation therewith. A plurality of bars or flutes 60 extend in uniform circumferentially spaced relation from one end of the drum 58 to the other in parallel relation to the axis shaft 54. The roll 26 is considerably smaller in diameter than the roll 24 although somewhat larger in diameter than roll 22. The spacing between the flutes of roll 24 is less than the spacing of the flutes on the roll 22, and greater than the spacing of the flutes on roll 26.

The roll 22 is positively driven from the propeller shaft 18 and gear box 20. As seen in FIGS. 1, 4 and 5, the gear box operates a shaft 62, the shaft having a sprocket 64 keyed thereto, and the sprocket drives a sprocket 66 keyed to the shaft 30 by a chain connection 68. Hence the rear roll 22 is positively driven by the power take-off shaft of the tractor.

Referring to FIG. 4, it will be noted that the flutes of roll 22 loosely mesh or interdigitate with the flutes of roll 24. It will also be noted that the flutes of the pickup roll 26 loosely mesh or interdigitate with the flutes of roll 24 at a point spaced from the point of flute interdigitation of rolls 22 and 24. Hence, the roll 24 is driven from roll 22 by reason of the interdigitation of the flutes thereof, and the roll 26 is in turn driven from roll 24 by a like flute interdigitation.

In general, the machine is drawn over a field of previously harvested crops in which crop toppings, including leaves and stems, form a layer supported on the stubble. Preferably, the layer of crop toppings is formed into narrow swaths by a windrowing operation. The pickup roll 26 is at an elevation to receive and pick up the toppings from the swath and to feed them into the bite between the interdigitating flutes of the rolls 24 and 26. The toppings are gripped between and deformed by the interdigitating flutes of the rolls 24 and 26 and then fed into the bite between the interdigitating flutes of rolls 22 and 24. The rolls 24 and 26 rotate in opposite directions, roll 24 turning counter-clockwise and roll 26 turning clockwise. Roll 22 likewise turns clockwise so that the toppings are fed in succession between the interdigitating flutes at the spaced points.

As pointed out above, the roll 24 is supported by the arms 44 for movement toward and away from the rolls 22 and 26 about the axis of the shaft 48. Secured to the shaft by a mounting 70 is a leaf spring 72. The leaf spring is rigidly secured to the shaft by mounting 70. The opposite end of the leaf spring is held down by a rod 74 the upper end of which extends through one of the leaves of spring 72 and is secured thereto by a nut 76. The head of the bolt 74 underlies a frame member 78, thereby holding down the end of the leaf spring assembly. The roll 24 may move away from the operative position illustrated in which its flutes properly interdigitate with those of the other rolls, but this movement is resisted by the resiliency of the leaf springs 72. The normal operative position of roll 24 is determined by fixed stops 79 engageable with arms 44.

The roll 26 is also supported for movement toward and away from the operative position illustrated in which its flutes interdigitate with those of roll 24. As shown particularly in FIGS. 4 and 5, the roll shaft 54 is supported on opposite ends by a pair of arms 80. The upper ends of the arms are pivotally secured to the frame member 27 by the aligned stub shafts 82. The lower ends of the arms journal the ends of the roll shaft 54, and the arms have reduced extensions 84 which are pivotally connected to the lower ends of rods 86. The upper ends of rods 86 are provided with the abutments 88 which are held in predetermined axially adjusted position by the nuts 90. The rods 86 extend through fixed abutments 92 formed in the frame member 78 of the machine, and a compression coil spring 94 encircles each rod between the abutments 88 and 92. The operative position is determined by engagement of arms 80 with fixed stops 93. Thus, the springs 94 provide a resilient resistance to movement of the roll 26 away from the operative position illustrated. The strength of the springs 74 is less than the strength of the leaf spring 72, or in other words the resistance to movement of the roll 26 away from its operative position by the combined action of the springs 94 is less than the resistance of the spring 72 to a similar retraction movement of the roll 24. Hence, if a foreign object, for example, should find its way between the interdigitating flutes of the rolls 24 and 26, the roll 26 would be the first to yield so that the crop conditioning action between the rolls 22 and 24 would continue to take place. Recesses 95 are provided in the frame of the machine to clear the roll 26 as it swings.

In operation, the toppings are picked up by the lowermost pickup roll 26 and delivered to the bite between the interdigitating flutes of rolls 24 and 26. The spaces between adjacent flutes on each roll are sufficiently wide to accommodate the leaves on the toppings so that they will not be crushed or deformed during the conditioning operation. The stems, however, will be deformed and transversely cracked and in fact stretched by the operation of a flute on one roll moving into the space between adjacent flutes of the other roll. This can best be seen in the diagrammatic illustration shown in FIG. 6 in which the line 99 represents a topping. As a flute on one roll moves into the space between flutes of the other roll, the crop or stem of the topping is folded into the pocket and deformed about the end of the flute entering the pocket, cracking the same. At the same time it is gripped and somewhat stretched by the entering flute.

The space between the point of interdigitation of the flutes of rolls 24 and 26 and the point of interdigitation between the flutes of rolls 22 and 24 is less than the length of a normal topping so that the toppings are simultaneously gripped and deformed by the rolls at the two points of flute interdigitation. Moreover, since the interdigitating flutes of rolls 24 and 26, for example, grip the stem, and at the same time the flute of one of the rolls 22 and 24 is moving into a pocket formed between adjacent flutes of the other roll, a definite stretching of the stem takes place. A stretching also takes place due to the gripping of the topping between the rolls 22 and 24 while the deforming action takes place between the flutes of the rolls 24 and 26. The stretching of the stems, occurring as it does simultaneously with the deformation of the stems, causes the stems to be opened up for a more rapid removal of moisture. The conditioned toppings will pass from the interdigitating flutes of the rolls 22 and 24 over the top of the roll 22 to be returned to the swath in a condition which will facilitate a more uniform cure of the entire topping, including both the stem and the leaves, than has heretofore been possible with other machines of this type.

In the event that a foreign object, for example, should enter the bite between the rolls 24 and 26, the roll 26 will first yield to clear the obstruction without affecting the conditioning action of the rolls 22 and 24. A further obstruction between rolls 22 and 24 may result in a yielding retraction of the roll 24 to clear the obstruction.

The spacing between adjacent flutes on each of the three rolls is wide enough so that the leaves on the toppings will not be crushed or deformed during the conditioning operation at either point of flute interdigitation. The stems, however, are deformed and transversely cracked and stretched by the action of the flutes so that the release of moisture from the stems is accelerated. Accordingly, the stems and leaves will cure in approximately the same time.

What I claim as my invention is:

1. Crop treating apparatus comprising a supporting frame adapted for advance over a field on which previously harvested plant toppings form a layer supported on their own stubble, first and second rolls carried by said frame on generally parallel axes each having circumferentially spaced, generally longitudinally extending flutes interdigitating with the flutes of the other, a third roll having circumferentially spaced, generally longitudinally extending flutes interdigitating with the flutes of said first roll at a point closely adjacent to but spaced from the point of interdigitation of the flutes of said first and second rolls, the flutes of said first and second rolls and of said first and third rolls defining bites at the spaced points of interdigitation at the same side thereof to receive toppings, and means for rotating said first roll in one direction and said second and third rolls in the opposite direction so that the interdigitating flutes move into the respective bites causing toppings to enter said bites in succession to be gripped between and deformed by the interdigitating flutes.

2. The crop treating apparatus defined in claim 1, wherein the bite between the first and second rolls is located adjacent said layer of plant toppings to gather the same directly thereinto.

3. The crop treating apparatus defined in claim 1, wherein said first roll is mounted for movement toward and away from said second and third rolls, a stop is provided limiting movement of said first roll toward said second and third rolls to an operative position suitable for proper interdigitation, and resilient means are provided urging said first roll toward said second and third rolls.

4. The crop treating apparatus defined in claim 3, wherein said second roll is mounted for movement toward and away from said first roll, a stop is provided limiting movement of said second roll toward said first roll to an operative position suitable for proper interdigitation, and resilient means are provided urging said second roll toward said first roll.

5. The crop treating apparatus defined in claim 4, wherein the first-mentioned resilient means offers greater resistance to movement of said first roll than said second-mentioned resilient means offers to the movement of said second roll.

6. The crop treating apparatus defined in claim 5, wherein the spacing between the flutes of the first roll is different than the spacing between the flutes of the second and third rolls.

References Cited in the file of this patent
UNITED STATES PATENTS

| | | |
|---|---|---|
| 2,304,811 | Frederickson | Dec. 15, 1942 |
| 2,711,622 | Cunningham | June 28, 1955 |
| 2,811,819 | Heth | Nov. 5, 1957 |
| 2,954,656 | Koch et al. | Oct. 4, 1960 |